(12) United States Patent
Carhuff et al.

(10) Patent No.: US 6,977,091 B2
(45) Date of Patent: Dec. 20, 2005

(54) FROTH SHOWERING

(75) Inventors: Peter W. Carhuff, Eau Claire, WI (US); Takeshi Masu, Ridgefield, CT (US); Michael H. Lago, New Milford, CT (US)

(73) Assignee: Nestec S.A., Vevey (CH)

( * ) Notice: Subject to any disclaimer, the term of this patent is extended or adjusted under 35 U.S.C. 154(b) by 229 days.

(21) Appl. No.: 10/268,777

(22) Filed: Oct. 11, 2002

(65) Prior Publication Data

US 2004/0071841 A1    Apr. 15, 2004

(51) Int. Cl.[7] .............................. A23L 2/00; B65B 3/04
(52) U.S. Cl. ..................... 426/590; 426/506; 426/564; 426/593; 426/594; 222/129.1; 99/275
(58) Field of Search ................................ 426/569, 250, 426/329, 330, 330.3, 422, 442, 506, 564, 426/590–599, 262, 263; 435/812; 222/129.4; 99/275

(56) References Cited

U.S. PATENT DOCUMENTS 3,934,823 A * 1/1976 Reed ........................... 239/472
4,388,338 A * 6/1983 Wittenborg ................. 426/590
4,493,249 A   1/1985 Stover .......................... 99/275
4,830,869 A   5/1989 Wimmers et al. ........... 426/433
5,549,933 A   8/1996 Adams et al. ............... 427/421
5,980,959 A * 11/1999 Frutin ........................ 426/112
2004/0018279 A1 * 1/2004 Johnson et al. ............. 426/250

FOREIGN PATENT DOCUMENTS

| EP | 0323592 A | 7/1989 | ............. A47J 31/40 |
| GB | 1367354 A | 9/1974 | ............. B01F 3/12 |
| GB | 1372282 A | 10/1974 | ............. B01D 9/04 |
| WO | WO 02087400 A | 7/2002 | ............. A47J 31/40 |

OTHER PUBLICATIONS

Kuntz, Lynn A. "Appearance Count". Food Product Design article, Mar. 1995. Retrieved from Internet on Feb. 17, 2005. URL<http://www.foodproductdesign.com/archive/1995/0395DE.html>.*

* cited by examiner

Primary Examiner—Keith Hendricks
Assistant Examiner—Maureen C. Donovan
(74) Attorney, Agent, or Firm—Winston & Strawn LLP

(57) ABSTRACT

The invention relates to a method to improve the appearance and texture of froth on a liquid food product. The liquid food product is prepared in a receptacle with a froth layer above a liquid layer. Droplets of a liquid are sprayed on the froth layer to increase the homogeneity thereof.

25 Claims, 1 Drawing Sheet

FROTH SHOWERING

FIELD OF THE INVENTION

The present invention relates to the preparation of beverages having a froth topping layer, such as milk and/or coffee beverages and milk-chocolate beverages. More particularly, the present invention relates to a method for improving the appearance and texture of the froth in beverages produced from coffee, chocolate and milk concentrates in automated dispensing apparatuses such as creamy coffee, cappuccino, or chocolate beverages.

BACKGROUND OF THE INVENTION

Numerous systems and apparatuses have been developed for the purpose of preparing and dispensing hot beverages having a smooth and thick froth topping layer of foamed coffee or frothed milk. Such dispensing machines typically operate by combining appropriate amounts of product concentrates like, for instance, instant coffee and milk powders or liquid concentrates with hot water and vigorously mixing them together in a suitable mixing bowl or whipper, and dispensing the reconstituted beverage into a cup or any other container through a dispensing nozzle. Such methods and systems are convenient for producing frothed beverages but the froth as resulting from such methods and systems suffer from several drawbacks.

Particularly, one drawback with the existing automated dispensing devices is that the appearance and consistency of the foam produced are not satisfying. In general, the froth on top of the beverage lacks uniform character, with a wide size range of bubbles and a large number of large bubbles. As a result, the froth shows a soapy foam appearance resulting in a tendency of the froth layer to collapse rapidly after its dispensing in the cup.

Another usual shortcoming more particularly, applicable for the preparation of cappuccino type beverages in automated dispensing apparatuses is that the milk froth and the liquid coffee phase slightly mix together during dispensing because of gravity and the dispensing flow rates. This results in an unpleasant, spotted brown dark coloration of the milk froth due to interstitial coffee present in the froth matrix.

Attempts have been made to overcome the problems encountered in the preparation of hot frothy beverages of the kind of cappuccino with automated dispensing apparatuses. One particular solution implemented is to inject water steam or pressurized air into a separate portion of milk to froth that portion individually and then pour it directly onto the coffee surface in the cup. But this does not compensate for the collapsing of the foam and it also often requires a separate container or bowl where to froth a part of the milk and thus increasing the number of elements in the dispensing apparatus. Another type of solution developed has been to design new dispensing devices to emulsify milk directly in a mixing chamber formed in a dispensing pipe while or prior to dispensing. The frothing of the milk is achieved thanks to mixing of pressurized gas and milk together in the mixing chamber and release of the frothed milk at the outlet of the mixing chamber located downstream relative to it. But in this case, the pressure of the gas in the mixing chamber causes high outflow rate of the frothed milk from the chamber and thus mixing of the froth with the coffee beverage in the cup resulting in the unpleasant brown color of the froth. This may also complicate hygienic cleaning of the pipe and mix chamber without leakage of cleaning product or fluid from the pipe.

SUMMARY OF THE INVENTION

The present invention provides a method and a dispenser that produces a liquid food, such as a beverage froth that can be prepared with both a homogenous appearance and texture. In a preferred method according to the invention, a liquid food is prepared in a receptacle. The food product has a froth layer above a liquid layer. Droplets of a liquid are sprayed on the froth layer to make the froth more homogenous.

Preferably, the droplets are sprayed to substantially wash interstitial material from the froth layer or from the surface of the froth, as well as to burst bubbles in the froth that are larger than a predetermined threshold size. More than about ⅔ of the surface of the food product is preferably sprayed, although more preferably substantially the entire surface of the food product is sprayed.

In the preferred embodiment, the food product is an aqueous food product, and the droplets comprise water. The sprayed droplets have an mean diameter of about between 300 to 700 microns, and about between 10,000 and 100,000 droplets are sprayed, preferably for a single serving of the food product, a cup or a drinking glass, and preferably of less than about two or three cups. The preferred volume of sprayed droplets is about between 2 ml and 10 ml of the droplets are sprayed.

The spraying can be carried out as a in a single application, or alternatively in intermittent applications spaced by spray pauses, preferably sufficiently long to allow the droplets from previous pulses to substantially drain from the froth or from the surface of the froth. Each intermittent spray application can last about between 0.1 and 1.5 seconds, and each spray pause can last between about 0.2 and 2 seconds. More preferably, each spray application lasts about between 0.3 and 0.8 seconds. The spray can be controlled to increase the creaminess of the froth and also the homogeneity of color and texture of the froth.

To prepare the food product, a food component is preferably mixed with a liquid. A preferred food product contains coffee, chocolate, milk, or a combination thereof, and the spray may include a colorant for coloring the froth.

The beverage preparation and spraying of the froth are conducted in and by operating a dispensing machine in the preferred embodiment. In this embodiment, the dispenser includes a liquid supply associated with a mixer for supplying a mixing liquid thereto. A food component supply is configured for supplying food component to the mixer, and the mixer is configured for mixing the food component and the mixing liquid to make a liquid food product. An outlet is configured for dispensing the liquid food product at a dispensing location. The mixer, the liquid and food component supplies, and the outlet are configured and associated such that the dispensed liquid food product has a froth layer on its surface.

Additionally, a sprayer liquid supply is associated with a sprayer for feeding a spray liquid thereto. The spray liquid can be the same as the mixing liquid, or it can be a different liquid, depending on the food product to be prepared. The sprayer is configured for spraying the froth layer with droplets of the spray liquid to increase the homogeneity of the froth. The mixer comprises a whipper or other device for mixing the component and the liquid, as well as preferably entrapping air in the mixture to create a froth. Where a whipper is used, it whips the food component and liquid.

The sprayer has a nozzle that is configured for spraying the droplets at a diverging spray angle at least about 30 degrees. The dispenser is preferably controlled by a control panel, preferably electronically, operatively associated with the supplies and sprayer for producing the food product and spraying the froth layer. One embodiment is an automated dispensing apparatus for dispensing the liquid food product, which includes a food preparation unit configured for preparing and frothing a liquid food product to make a liquid food with a froth layer on its surface. An outlet is associated with the food preparation unit for delivering the liquid food product into a container, and a sprayer is configured for spraying a spray liquid on the froth layer with droplets of the spray liquid to increase the homogeneity of the froth.

DETAILED DESCRIPTION OF THE PREFERRED EMBODIMENTS

Figure 1:
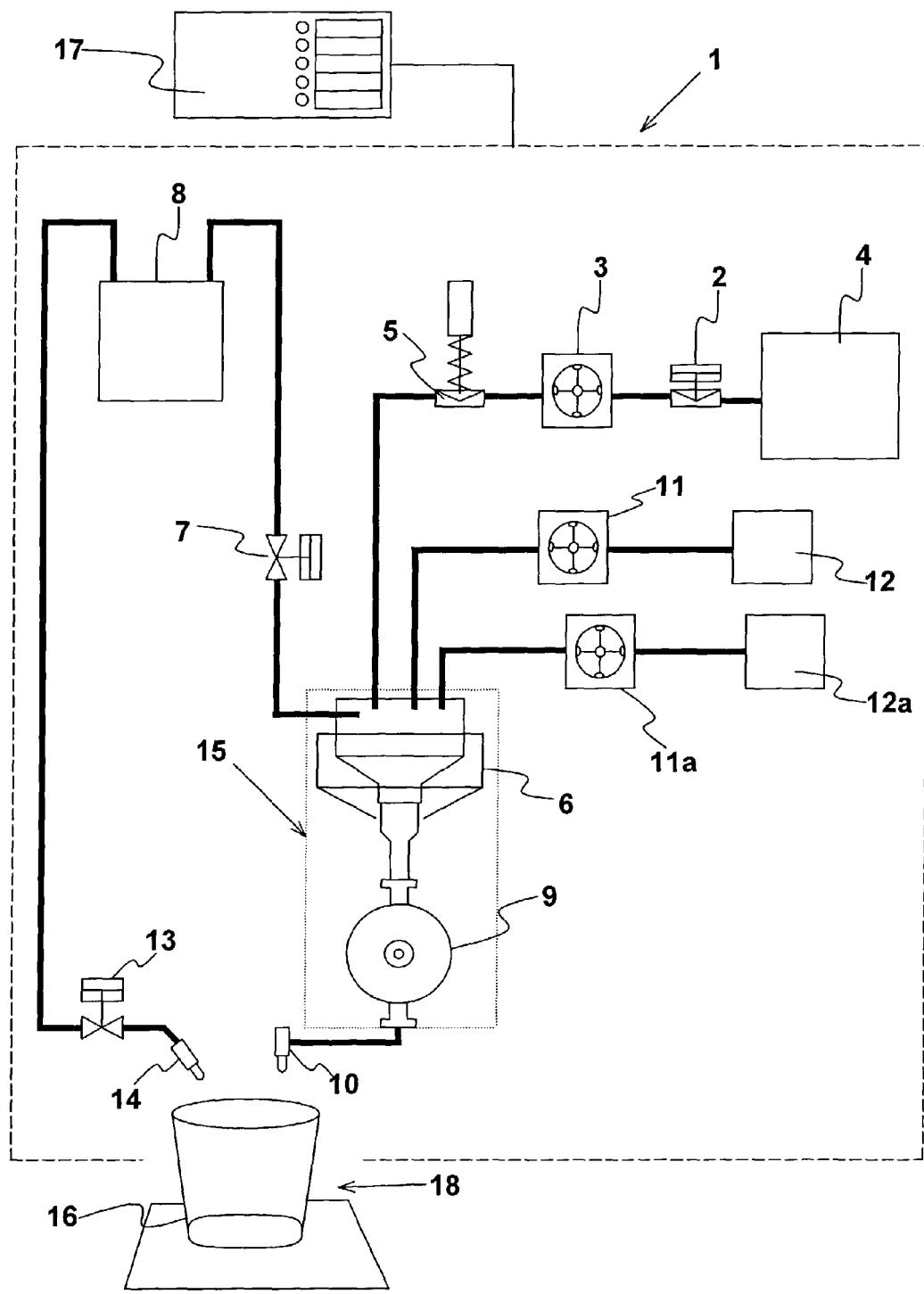
FIG. 1 is a schematic view of a dispenser for preparing a frothy beverage according to the invention.

The present invention addresses these shortcomings of the existing automated dispensing machines and to provide a method for improving the appearance and texture of the froth topping layer in hot beverage. More particularly, the present invention is directed to the preparation and dispensing of cappuccino-like coffee beverages, milk-chocolate beverages or other coffee specialties such as creamy black coffee ("crema" type coffee) and the like. Additionally, the present invention is also directed to a simple and low cost method for significantly whitening a milk based froth and refining its structure so that it has a real "household-made" appearance, with white and creamy milk topping layer rather than brown flat and soapy foam.

The method according to the present invention addresses the preparation and dispensing of hot beverages with automated dispensing machines. This method comprises the steps of preparing and dispensing in a receptacle a beverage product with a foam layer on its surface and with a sufficient amount of foam for consumption by a consumer. The method according to the invention further includes showering the top of the froth layer of the beverage product as dispensed with fine droplets of liquid for a predetermined time. This showering step in the preparation of the frothy beverage product has the advantage to significantly improve the appearance of the froth.

Indeed, it has been found by the applicant that spraying droplets of an aqueous liquid, preferably water, on the surface of the froth as produced, for example, in the preparation of a cappuccino type beverage or other has a beneficial moistening effect on the top of the froth that results in a more creamy appearance and texture.

A further advantage of the method is that, on spraying, the water droplets impinge the froth surface and burst the larger bubbles in the froth matrix, giving it much finer and whipped cream appearance rather than the soapy foam appearance obtained solely by steaming or air incorporation. Bubbles larger than a threshold diameter are burst. The threshold diameter preferably is at least about 0.8 mm and up to about 1.2 mm, and is more preferably about 1 mm, leaving bubbles that are smaller than the threshold size in the froth. In other embodiments, such as for preparing different types of food or beverages, different thresholds may be selected. Preferably at least about 80% of the bubbles above the threshold size are burst, and more preferably at least about 90%.

In the present invention, the froth generally refers to a layer of gas filled bubbles floating on the surface of a dispensed volume of liquid. The froth may be formed of a component identical to the liquid. For instance, the bubbles may be coffee bubbles floating on the surface of coffee. The froth may alternatively be formed of a component that is different from the liquid component. For example, the gas filled bubble may be formed of a dairy component such as skimmed or whole milk, cream and the like whereas the liquid may be formed of coffee, chocolate, tea or other similar hot liquid.

Another further improvement coming from the method according to the present invention consists in the "washing" of the froth surface that is achieved by the spraying of water droplets. On dispensing froth of different components such as milk and coffee for cappuccino type beverages, some of the coffee material tends to mix with the milk froth layer causing an unpleasant, spotted brown color of the froth on the beverage. The brown coffee material tends to be interstitial material lying around the froth bubbles but not incorporated into them. By spraying droplets of water this coffee material retained within the froth matrix is drained downward from the froth upper layer to the bottom one leaving the froth whiter and thus enhancing the appearance and texture improvement of the froth.

The preferred apparatus comprises at least one container and one pump for sampling a predetermined amount of food product component, such as a concentrate in the preferred embodiment or a powder in another embodiment, from the container and, one mixing assembly and a water supply for combining and mixing the amount of product concentrate sampled with water to prepare a frothy beverage product. The apparatus comprises also one dispensing nozzle for dispensing the beverage product prepared in the mixing assembly in a suitable recipient and, one showering nozzle for spraying droplets of a liquid over the froth layer of the beverage dispensed in the recipient in accordance with the method of the present invention.

In a preferred embodiment of an apparatus for preparing an exemplary frothy milk and/or coffee based beverage according to the invention as shown in FIG. 1, an operator selects the desired beverage, for example a cappuccino, from the command panel 17 of the device. Preferably an electronic controller actuates the preparation process of the cappuccino beverage and operates the different parts of the dispenser apparatus described herein. A valve 2 and a pump 3 turn on to begin flow of milk concentrate from a milk concentrate container 4. The container 4 can be for instance a hermetically sealed removable milk pouch. The pressure generated by the pump 3 forces milk past a spring-loaded milk pinch valve 5 to a whipper bowl 6, which is connected to a whipper 9.

A mixer of the apparatus preferably includes a whipper assembly, as described below with reference to the preferred embodiment, which may operate with an impeller or other spinning component. Alternative embodiments employ other types of mixers that mix the components of the beverage or other food being prepared, preferably while entrapping air. For instance, another embodiment of the mixer receives a capsule that contains a food component, such as soluble coffee, and injects hot water into the capsule at high pressure to perform the mixing with in the capsule.

In the preferred embodiment, the whipper bowl 6 and whipper 9 are part of a mixing assembly 15. While milk concentrate flows to the whipper bowl, valve 7 opens to begin a flow of hot water from a hot water tank 8 to the whipper bowl 6 where hot water and milk begin to mix together. Whipper bowl 6 is activated for homogenizing the blend of hot water and milk. Then the hot reconstituted milk liquid flows from the bowl 6, through the whipper 9, through the dispensing nozzle 10 and into a receptacle, such as a cup 16, which is received in a dispensing area 18. This step occurs for a predetermined period to achieve dosage of water and milk for preparing an individual serving of the beverage. After this period, milk pump 3 turns off. The dispensing area is preferably dimensioned for receiving a drinking cup or glass, and for positioning the nozzle at less than about 10 cm above the beverage surface, although other distances may be employed in other embodiments.

After a predetermined delay, preferably of about one second, whipper 9 is shut off, and a coffee pump 11 turns on for delivering coffee concentrate, preferably in controlled doses, from a coffee container 12 to the whipper bowl 6. Alternatively, in the case the beverage product prepared is a hot chocolate beverage, pump 11a turns on for sampling chocolate concentrate from a chocolate container 12a. Container 12 and 12a are preferably of the same or similar kind of milk as in the container 4, i.e. hermetically sealed removable pouches, but very different from each other in another embodiment. Coffee and hot water flow into the bowl 6, through the whipper 9, and through the nozzle 10 and into the cup 16, for a predetermined time and at a selected rate to achieve desired dosage. After the coffee dosage has been achieved, coffee pump 11 turns off.

In the embodiment, after a small delay to deliver the remainder of hot water required by the recipe, the hot water valve turns off. The remainder of the hot water after the milk and coffee have been added has the advantage to allow for recovery of most of the milk and coffee remaining in the whipper bowl 6 and whipper 6 from the system and into the cup.

Then, a showering valve 13 turns on for preferably several seconds, as described below, to supply water to a spraying nozzle 14 to spray water on the foam on the top of the cappuccino beverage prepared in the cup according to the method of the present invention. The spraying phase acts for washing the brown coffee material from the top layer of the foam to whiten the upper layer of the cappuccino froth topping. It also breaks larger bubbles and moistens the foam to refine the froth structure and to give the froth topping a whipped and creamy appearance and to increase the creaminess and homogeneity of its appearance.

To complete an appropriate spraying of the foam layer and achieve a satisfying whitening and appearance of the foam, care should be given to the water droplet size. A suitable droplet size is obtained by a combination of the nozzle orifice size, the nozzle orifice design and the pressure of the water supplied to the spraying nozzle. The nozzle has preferably an orifice size of about 0.1 to 1 mm, more preferably of from 0.50 to 0.85 mm, and most preferably between 0.7 mm and 0.8 mm Optimum results were obtained with a nozzle having an orifice size of 0.762 mm The nozzle preferably operates to distribute droplets in a diverging configuration on the surface of the froth. A diverging configuration has proved to provide smaller droplets as compared to a straight configuration and form a widespread and uniform washing effect on the froth without creating recessed areas on the surface, although a straight or other configurations can alternately be used. The nozzle preferably has a tapered orifice adapted to form a divergent spray angle ranging of from about 45 to 60 degrees, more preferably about 50 to 55 degrees.

Water spraying is preferably operated at a pressure ranging of about 1 to 2 bars, more preferably of from 1.35 to 1.40 bar of pressure.

More generally, size of the water droplets sprayed should fall within the range of 300 to 700 microns. Indeed, if the droplets are smaller, there may be little if any breaking down of the larger bubbles, and thus the refining of the structure of the froth and the appearance expected may not be obtained. Also, with smaller droplets, spraying is done longer than with larger droplets to provide enough water to displace the coffee material stuck or held in the froth matrix.

On the other hand, if the droplets are too large, the spraying can damage the froth topping, punching holes in it. Furthermore there is a limit to the amount of water that can be sprayed without diluting the beverage product prepared. With excessively large droplets coverage of the entire surface of the froth tends to be insufficient to adequately wash out coffee from the froth matrix. There may be a relatively large amount of water concentrated where the droplets hit the foam rather than a more even distribution over the entire top layer of froth. As a consequence, the froth has a tendency to collapse where the droplets hit the foam and thus the water sprayed mixes with the cappuccino beverage, causing the beverage to be overly diluted.

As it is desirable always getting optimum effect on the froth texture whatever the volume of the beverage product delivered is, the amount of water sprayed is preferably relatively small, and it is preferred to calculate this amount to provide the final desired liquid content of the frothy beverage prepared. Therefore the overall amount of water used in the preparation prior to dispensing of the beverage in the cup is lowered by the amount of water sprayed after dispensing for a good achievement of the recipe. It has been determined that the volume of water to be used for showering, according to the present invention, the froth for a cup of beverage is less than 10 ml, preferably from about 2 to 6 ml. To obtain the best appearance and texture of the froth topping after spraying, the volume of water sprayed is preferably more than about 0.001 times, more preferably about from 0.005 to 0.3 times, and most preferably about from 0.01 to 0.2 times the total volume of the beverage. For example, in the preparation of a 250 ml beverage, the preferred volume of the water sprayed is about 1 to 3 ml. Preferably, the ratio of the volume of water sprayed to the volume of froth is about between 1:100 and 1:200, although this can be varied depending on how creamy or wet the froth is desired to appear.

This volume of water can be then distributed over a single gentle application of a few seconds, preferably about between 0.2 and 3 seconds, for a smooth contact between the water droplets and the froth upper layer. In this way, the showering provides a satisfying appearance and taste of the product, e.g., a cappuccino type beverage. After a predetermined time corresponding to a value and an adequate showering of the froth, the showering valve 14 shuts off and the beverage is available for consumption by the operator.

In another preferred embodiment, the showering of the froth topping layer of the beverage is applied over intermittent repeated short pulses. Through several batches of tests, it has been determined that an optimum showering application is obtained with intermittent pulses, rather than a sustained application. When showering the top froth layer over a single sustained pulse, the spraying of water droplets tends to push larger bubbles and the coffee material retained in the froth matrix, rather than bursting larger bubbles or wash the coffee material down into the lower layers of froth. Intermittent spraying allows for draining of the coffee material with the water sprayed between each pulse, with each further spray driving the coffee further down into the froth matrix. Also, larger bubbles are not pushed into areas of low water-droplet coverage, but tend to stay in place and with successive sprays, a greater amount of burst bubbles is obtained.

The showering of the froth layer is preferably carried out by at least two repeated short pulses, preferably at least three pulses applied each of them during a spraying duration of from 0.1 to 1.5 seconds, preferably 0.3 to 0.8 seconds. In order to not delay too much dispensing time but allow draining of the coffee material between each pulse, the rest time between two pulses preferably ranges from about 0.2 to about 2 seconds, and more preferably of from about 0.3 to about 0.6 seconds. Considering, for instance, a mean droplet diameter of 300 to 700 microns and an optimum volume of water of around 3.6 ml adequate coverage, whitening, and refining of the entire surface of the froth is achieved when the volume of water is sprayed over 3 pulses of about 0.5 seconds duration each and preferably of equal volumes of water, with about 0.5 seconds between each pulse. For a conventional cup with a 70 mm diameter, approximately 23,000 droplets sprayed would cover the entire surface of the cup containing the beverage product. With 3 pulses showering of the froth, each pulse produces approximately 18,000 droplets and thus, in the total of 3 sprayings of 1.2 ml each, approximately 54,000 droplets of water are produced, enough to shower the entire surface of the froth layer on the beverage twice. Preferably, the amount of droplets and of and of water sprayed is sufficient to shower the entire surface between about one to four times. Of course, those figures might change to adapt to the surface of the froth to be treated. A higher surface would require a number of droplets larger than 23,000 whereas a smaller surface would require a lower number accordingly. More generally, the number of droplets to be sprayed may vary of from 10,000 to 100,000 droplets depending on the froth surface to be treated, the thickness, and/or the nature of the froth.

In another embodiment, the method of the present invention is implemented and adapted for the preparation of other products besides the combination of coffee, milk, or chocolate. For example, by adding colorant to the water used for spraying the froth, the showering of the froth can be used for coloring the froth layer of any type of frothy beverage.

While illustrative embodiments of the invention are disclosed herein, it will be appreciated that numerous modifications and other embodiments may be devised by those skilled in the art. For example, the amount of droplets and the type of beverage may be altered in other embodiments. Therefore, it will be understood that the appended claims are intended to cover all such modifications and embodiments that come within the spirit and scope of the present invention.

What is claimed is:

1. A method for improving the appearance and texture of froth on a liquid food product, comprising: preparing the liquid food product in a receptacle with a froth layer above a liquid layer; and spraying droplets of a liquid on the froth layer to selectively burst bubbles of the froth layer to increase the homogeneity thereof, wherein the sprayed droplets have a mean diameter of about between 300 to 700 microns.

2. A method for improving the appearance and texture of froth on a liquid food product, comprising: preparing the liquid food product in a receptacle with a froth layer above a liquid layer; and spraying droplets of a liquid on the froth layer to selectively burst bubbles of the froth layer to increase the homogeneity thereof, wherein a single serving of the food product is prepared and about between 10,000 and 100,000 droplets are sprayed.

3. The method of claim 2, wherein the single serving is less than about two cups.

4. A method for improving the appearance and texture of froth on a liquid food product, comprising: preparing the liquid food product in a receptacle with a froth layer above a liquid layer; and spraying droplets of a liquid on the froth layer to selectively burst bubbles of the froth layer to increase the homogeneity thereof, wherein a single serving of the food product is prepared and about between 2 ml and 10 ml of the droplets are sprayed.

5. The method of claim 4, further comprising operating a dispensing machine for the preparing of the food product and the spraying of the droplets.

6. The method of claim 5, wherein the droplets are sprayed in a single application.

7. A method for improving the appearance and texture of froth on a liquid food product, comprising: preparing the liquid food product in a receptacle with a froth layer above a liquid layer; and spraying droplets of a liquid on the froth layer to selectively burst bubbles of the froth layer to increase the homogeneity thereof, wherein the droplets are sprayed in intermittent applications spaced by spray pauses sufficiently long to allow the droplets from previous pulses to substantially drain from the surface of the froth.

8. The method of claim 7, wherein each spray application lasts about between 0.1 and 1.5 seconds.

9. The method of claim 8, wherein each spray pause lasts about between 0.2 and 2 seconds.

10. The method of claim 7, wherein each spray application lasts about between 0.3 and 0.8 seconds.

11. The method of claim 1, wherein the preparing of the food product comprises mixing a food component with a liquid.

12. The method of claim 11, wherein the food product contains coffee, chocolate, milk, or a combination thereof.

13. The method of claim 1, wherein the spray includes a colorant for coloring the froth.

14. The method of claim 1, wherein the surface is sprayed to increase the creaminess of the froth.

15. The method of claim 1, wherein the surface is sprayed to increase the homogeneity of color and texture of the froth.

16. The method of claim 1, wherein at least about 80% of bubbles of the froth layer that are larger than a threshold size of at least about 0.8 mm.

17. The method of claim 2, wherein at least about 80% of bubbles of the froth layer that are larger than a threshold size of at least about 0.8 mm.

18. The method of claim 4, wherein at least about 80% of bubbles of the froth layer that are larger than a threshold size of at least about 0.8 mm.

19. The method of claim 1, wherein the spraying of the froth substantially leaves in the froth bubbles that are smaller than the threshold size.

20. The method of claim 1, wherein the liquid food product is an aqueous food product, and the droplets comprise water.

21. The method of claim 1, wherein the liquid food comprises a beverage.

22. The method of claim 1, wherein the droplets are sprayed to substantially wash interstitial material from the froth layer.

23. The method of claim 1, wherein more than about ⅔ of the surface of the food product is sprayed.

24. The method of claim 23, wherein substantially the entire surface of the food product is sprayed.

25. The method of claim 7, wherein at least about 80% of bubbles of the froth layer that are larger than a threshold size of at least about 0.8 mm.

* * * * *